(12) United States Patent
Bowden et al.

(10) Patent No.: US 7,566,350 B2
(45) Date of Patent: Jul. 28, 2009

(54) METHOD OF MAKING NON-AQUEOUS ELECTROCHEMICAL CELL

(75) Inventors: William L. Bowden, Nashua, NH (US); Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 575 days.

(21) Appl. No.: 11/516,084

(22) Filed: Sep. 6, 2006

(65) Prior Publication Data

US 2007/0000121 A1   Jan. 4, 2007

Related U.S. Application Data

(63) Continuation of application No. 10/085,303, filed on Feb. 28, 2002, now abandoned.

(51) Int. Cl.
*H01M 6/00* (2006.01)

(52) U.S. Cl. .................. 29/623.1; 429/163; 429/324

(58) Field of Classification Search ............... 29/623.1, 29/730; 429/163, 188, 324, 326; 134/10, 134/22.1; 204/158.2, 227, 232, 247.2
See application file for complete search history.

(56) References Cited

U.S. PATENT DOCUMENTS

| | | | |
|---|---|---|---|
| 345,124 A | 7/1886 | DeVirloy | |
| 2,993,946 A | 7/1961 | Lozier | |
| 3,732,124 A | 5/1973 | Cailley | |
| 3,761,314 A | 9/1973 | Cailley | |
| 3,905,851 A | 9/1975 | Davis, Jr. | |
| 4,129,691 A | 12/1978 | Broussely | |
| 4,279,972 A | 7/1981 | Moses | |
| 4,401,735 A | 8/1983 | Moses et al. | |
| 4,499,160 A | 2/1985 | Babai et al. | |
| 4,526,846 A | 7/1985 | Kearney et al. | |
| 4,529,675 A | 7/1985 | Sugalski | |
| 4,555,457 A | 11/1985 | Dhanji | |
| 4,755,440 A | 7/1988 | Peled et al. | |
| 4,803,137 A | 2/1989 | Miyazaki et al. | |
| 4,863,817 A | 9/1989 | Ogino et al. | |
| 4,865,932 A | 9/1989 | Masuda et al. | |
| 4,925,751 A | 5/1990 | Shackle et al. | |
| 4,957,833 A | 9/1990 | Daifuku et al. | |
| 4,971,686 A | 11/1990 | Tucholski et al. | |
| 5,007,467 A * | 4/1991 | Nelles ...................... 141/1.1 | |
| 5,077,152 A | 12/1991 | Yoshino et al. | |
| 5,094,556 A * | 3/1992 | Kohler ..................... 401/9 | |
| 5,114,811 A | 5/1992 | Ebel et al. | |
| 5,176,968 A | 1/1993 | Blasi et al. | |
| 5,186,758 A * | 2/1993 | Hartman ................... 134/10 | |
| 5,204,196 A | 4/1993 | Yokomichi et al. | |
| 5,225,296 A | 7/1993 | Ohsawa et al. | |
| 5,240,794 A | 8/1993 | Thackeray et al. | |
| 5,272,022 A | 12/1993 | Takami et al. | |
| 5,278,005 A | 1/1994 | Yamauchi et al. | |
| 5,418,084 A | 5/1995 | Georgopoulos | |
| 5,462,820 A | 10/1995 | Tanaka | |
| 5,523,073 A | 6/1996 | Sumida et al. | |
| 5,541,022 A | 7/1996 | Mizumoto et al. | |
| 5,554,462 A | 9/1996 | Flandrois et al. | |
| 5,567,548 A | 10/1996 | Walk et al. | |
| 5,569,558 A | 10/1996 | Takeuchi et al. | |
| 5,580,683 A | 12/1996 | Takeuchi et al. | |
| 5,595,841 A | 1/1997 | Suzuki | |
| 5,639,577 A | 6/1997 | Takeuchi et al. | |
| 5,691,081 A | 11/1997 | Krause et al. | |
| 5,750,277 A | 5/1998 | Vu et al. | |
| 5,773,734 A | 6/1998 | Young | |
| 5,811,205 A | 9/1998 | Andrieu et al. | |
| 5,851,693 A | 12/1998 | Sano et al. | |
| 5,958,625 A | 9/1999 | Rao | |
| 6,001,509 A | 12/1999 | Kim et al. | |
| 6,017,656 A | 1/2000 | Crespi et al. | |
| 6,025,096 A | 2/2000 | Hope | |
| 6,030,422 A | 2/2000 | Pyszczek | |
| 6,030,728 A | 2/2000 | Cotte et al. | |
| 6,045,950 A | 4/2000 | Chang | |
| 6,053,953 A | 4/2000 | Tomiyama et al. | |
| 6,090,506 A | 7/2000 | Inoue et al. | |
| 6,165,644 A | 12/2000 | Nimon et al. | |
| 6,168,889 B1 | 1/2001 | Dix et al. | |
| 6,190,803 B1 | 2/2001 | Tomiyama et al. | |

(Continued)

FOREIGN PATENT DOCUMENTS

| | | |
|---|---|---|
| CA | 2336323 | 6/1999 |
| EP | 0 138 056 | 9/1984 |
| EP | 116115 | 5/1986 |
| EP | 0 262 846 | 9/1987 |
| EP | 0 270 264 | 11/1987 |
| EP | 0 441 589 A1 | 8/1991 |
| EP | 0 364 340 B1 | 5/1992 |
| EP | 0391720 | 6/1995 |
| EP | 0 902 492 A1 | 3/1999 |

(Continued)

OTHER PUBLICATIONS

"Lithium-bis(oxalate)borate: A Halogen-Free Conducting Salt for Lithium Batteries", Version 2.0/Mar. 2001 (11 pages).

(Continued)

*Primary Examiner*—Raymond Alejandro
(74) *Attorney, Agent, or Firm*—Fish & Richardson P.C.

(57) ABSTRACT

A lithium electrochemical cell includes an electrolyte having a mixture of solvents including propylene carbonate (PC) and dimethoxyethane (DME), and a salt mixture. The salt mixture includes lithium trifluoromethanesulfonate (LiTFS), and lithium trifluoromethanesulfonimide (LiTFSI), and the cell contains less than 1500 ppm by weight of sodium. The mixture of solvents can further include ethylene carbonate (EC).

18 Claims, 1 Drawing Sheet

U.S. PATENT DOCUMENTS

| | | | |
|---|---|---|---|
| 6,218,055 | B1 | 4/2001 | Shah et al. |
| 6,322,928 | B1 | 11/2001 | Thackeray et al. |
| 6,352,793 | B2 | 3/2002 | Kitoh et al. |
| 6,447,957 | B1 | 9/2002 | Sakamoto et al. |
| 6,506,516 | B1 | 1/2003 | Wietelmann et al. |
| 6,521,374 | B1 | 2/2003 | Nakanishi et al. |
| 6,689,511 | B2 | 2/2004 | Yamada et al. |
| 6,780,543 | B2 | 8/2004 | Yoshimura et al. |
| 2001/0028871 | A1 | 10/2001 | Harrison et al. |
| 2001/0033964 | A1 | 10/2001 | Heider et al. |
| 2002/0028389 | A1 | 3/2002 | Sonoda et al. |
| 2003/0113622 | A1 | 6/2003 | Blasi et al. |
| 2003/0124421 | A1 | 7/2003 | Issaev et al. |
| 2003/0143112 | A1 | 7/2003 | Suslick et al. |
| 2003/0186110 | A1 | 10/2003 | Sloop |
| 2004/0005267 | A1 | 1/2004 | Boryta et al. |
| 2004/0053138 | A1 | 3/2004 | Otterstedt et al. |
| 2004/0096746 | A1 | 5/2004 | Wietelmann et al. |
| 2005/0019670 | A1 | 1/2005 | Amine et al. |
| 2005/0191545 | A1 | 9/2005 | Bowles et al. |
| 2005/0202320 | A1 | 9/2005 | Totir et al. |
| 2006/0216597 | A1 | 9/2006 | Boczer et al. |

FOREIGN PATENT DOCUMENTS

| | | |
|---|---|---|
| EP | 0 852 072 B1 | 9/1999 |
| FR | 1415519 | 9/1965 |
| JP | 63-241867 | 10/1988 |
| JP | 1-227990 | 9/1989 |
| JP | 02-056849 | 2/1990 |
| JP | 02-204976 | 8/1990 |
| JP | HEI 3-84858 | 4/1991 |
| JP | 05-013105 | 1/1993 |
| JP | HEI 5-174873 | 7/1993 |
| JP | 07037572 A | 2/1995 |
| JP | HEI 7-37572 | 2/1995 |
| JP | HEI 8-64237 | 3/1996 |
| JP | HEI 9-45373 | 2/1997 |
| JP | HEI 09-050823 | 2/1997 |
| JP | 09-270272 | 10/1997 |
| JP | HEI 10-50272 | 2/1998 |
| JP | 10-116633 | 5/1998 |
| JP | 10-208725 | 7/1998 |
| JP | HEI 10-189007 | 7/1998 |
| JP | 11-195410 | 7/1999 |
| JP | HEI 11-214016 | 8/1999 |
| JP | P2000-12044 A | 1/2000 |
| JP | 1-281676 | 5/2000 |
| JP | 2001-143753 | 5/2001 |
| JP | 2003-249208 | 9/2003 |
| WO | WO 88/03331 | 5/1988 |
| WO | WO 90/11999 | 10/1990 |
| WO | WO 97/11504 | 3/1997 |
| WO | WO 99/30381 | 6/1999 |
| WO | WO00/55935 | 9/2000 |
| WO | WO01/80621 A3 | 11/2001 |

OTHER PUBLICATIONS

Linden, D., Handbook of Batteries, McGraw-Hill, Inc., 1995 "1.4 Classification of Cells and Batteries", pp. 1.9-1.11; "7.1 General Characteristics and Applications of Primary Batteries", pp. 7.3-7.7 "23.1 General Characteristics and Applications of Secondary Batteries", pp. 23.3-23.12.

Linden, D., Handbook of Batteries, McGraw-Hill, Inc., 1995 "12.1 General Characteristics", pp. 12.1-12.16.

Linden, D., Handbook of Batteries and Fuel Cells, McGraw-Hill, Inc., 1984 "11.13 Lithium/Bismuth Oxide Cells", pp. 11-79-11-80.

Xu, W. et al., "LiBOB and Its Derivatives: Weakly Coordinating Anions, and the Exceptional Conductivity of Their Nonaqueous Solutions", Electrochemical and Solid-State Letters, 4 (1) E1-E4 (2001).

Xu, K. et al., "LiBOB as Salt for Lithium-Ion Batteries: A Possible Solution for High Temperature Operation", Electrochemical and Solid-State Letters, 5 (1) A26-A29 (2002).

Xu, K. et al., "Lithium Bis(oxalate)borate Stabilizes Graphite Anode in Propylene Carbonate", Electrochemical and Solid-State Letters, 5(11) A259-A262 (2002).

Falk, S.U., Alkaline Storage Batteries, John Wiley & Sons, Inc. (New York, NY), 1969, pp. 1-41.

Wang, X. et al., "Inhibition of Anodic Corrosion of Aluminum Cathode Current Collector on Recharging in Lithium Imide Electrolytes", Electrochimica Acta 45 (2000) 2677-2684.

Morita et al., "Lithium Cycling Efficiency on the Aluminum Substrate in Blended Sulfolane-Ether Systems", J. Electrochem. Soc. :Electrochemical Science and Technology, vol. 134, No. 11, pp. 2665-2669, Nov. 1997.

Matsuda et al., "Organic Electrolyte Solutions for Rechargeable Lithium Batteries", Journal of Power Sources, 20 (1987) 273-278.

Aluminum 1145-O Available Web Site: http://www.matweb.com/search/SpecificMaterialPrint.asp?bassnum=MA1140 Retrieved from the Internet prior to the filing of the application.

Aluminum 7075-O Available Web Site: http://www.matweb.com/search/SpecificMaterialPrint.asp?bassnum=MA7070 Retrieved from the Internet prior to the filing of the application.

Aluminum 6061-O Available Web Site: http://www.matweb.com/search/SpecificMaterialPrint.asp?bassnum=MA6010 Retrieved from the Internet prior to the filing of the application.

Allegheny Ludlum Type 316L Stainless Steel, UNS S31603 Available Web Site: http://www.matweb.com/search/SpecificMaterialPrint.asp?bassnum=NL316L Retrieved from the Internet prior to the filing of the application.

Aluminum 2024-O Available Web Site: http://www.matweb.com/search/SpecificMaterialPrint.asp?bassnum=MA2240 Retrieved from the Internet prior to the filing of the application.

List of References [online], 93 pages. Retrieved from: the Thomson Derwent World Patent Index. Retrieved prior to the filing of the application.

List of References [online], 103 pages. Retrieved from: the Thomson Derwent World Patent Index. Retrieved prior to the filing of the application.

List of References [online], 4 pages. Retrieved from: the Thomson Derwent World Patent Index. Retrieved prior to the filing of the application.

List of References [online], 31 pages. Retrieved from: the Thomson Derwent World Patent Index. Retrieved prior to the filing of the application.

List of References [online], 10 pages. Retrieved from: the Thomson Derwent World Patent Index. Retrieved prior to the filing of the application.

List of References [online], 5 pages. Retrieved from: the Thomson Derwent World Patent Index. Retrieved prior to the filing of the application.

List of References [online], 61 pages. Retrieved from: the Thomson Derwent World Patent Index. Retrieved prior to the filing of the application.

List of References [online], 2 pages. Retrieved from: the Thomson Derwent World Patent Index. Retrieved prior to the filing of the application.

Machine Translation of JP 07037572.

David Linden, "Rechargeable Lithium Batteries", Handbook of Batteries, pp. 36.13-36.16, Undated.

Product Information, 3M Fluorad Lithium (Bis) Trifluoromethanesulfonimide Battery Electrolyte HQ-115, Sep. 1997.

* cited by examiner

METHOD OF MAKING NON-AQUEOUS ELECTROCHEMICAL CELL

CROSS-REFERENCE TO RELATED APPLICATION

This application is a continuation application of and claims priority to U.S. Ser. No. 10/085,303, filed on Feb. 28, 2002 now abandoned, which is hereby incorporated by reference.

TECHNICAL FIELD

The invention relates to non-aqueous electrochemical cells.

BACKGROUND

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

It is desirable for batteries to have good capacity, after they are produced and/or after they have been stored for extended periods of time.

SUMMARY

The invention relates to non-aqueous electrochemical cells.

In one aspect, the invention features a lithium electrochemical cell including an electrolyte having a mixture of solvents including propylene carbonate and dimethoxyethane, and a salt mixture including lithium trifluoromethanesulfonate and lithium trifluoromethanesulfonimide. The cell contains less than 1500 ppm by weight of sodium.

Embodiments of the invention may include one or more of the following features. The cell contains less than 1200 ppm, e.g., less than 1000 ppm, less than 800 ppm, or less than 600 ppm, by weight of sodium. The cell includes a mixture of solvents having 40-80%, e.g., 50-75%, by weight of dimethoxyethane, and 20-60%, e.g., 25-50%, by weight of propylene carbonate; and the salt mixture has a concentration between 0.4 M and 1.2 M in the mixture of solvents.

In another aspect, the invention features a lithium electrochemical cell including an electrolyte having a mixture of solvents including ethylene carbonate, propylene carbonate, and dimethoxyethane, and a salt mixture having lithium trifluoromethanesulfonate and lithium trifluoromethanesulfonimide. The cell contains less than 1500 ppm, e.g., less than 1200 ppm, less than 1000 ppm, less than 800 ppm, or less than 600 ppm by weight of sodium.

Embodiments of the invention may include one or more of the following features. The cell includes a mixture of solvents having less than 30%, e.g. 10-20%, by weight of ethylene carbonate, 40-85%, e.g., 50-70%, by weight of dimethoxyethane; and the salt mixture has a concentration between 0.4 M and 1.2 M in the mixture of solvents. The cell includes a mixture of solvents including 5-15% by weight of ethylene carbonate, 70-80% by weight of dimethoxyethane, and 10-20% by weight of propylene carbonate. The cell contains less than 500 ppm by weight of sodium.

In another aspect, the invention features an electrolyte for a lithium electrochemical cell consisting essentially of a mixture of solvents including propylene carbonate and dimethoxyethane, and a salt mixture having lithium trifluoromethanesulfonate and lithium trifluoromethanesulfonimide. The electrolyte can be used in a cell, e.g., one that contains less than 1500 ppm, e.g., less than 1000 ppm, or less than 500 ppm, by weight of sodium.

The electrolyte mixture can include a mixture of solvents including 40-80%, e.g., 50-75%, by weight of dimethoxyethane, and 20-60%, e.g., 25-50%, by weight of propylene carbonate; and the salt mixture can have a concentration between 0.4 M and 1.2 M in the mixture of solvents.

In another aspect, the invention features an electrolyte for a lithium electrochemical cell consisting essentially of a mixture of solvents including ethylene carbonate, propylene carbonate, and dimethoxyethane, and a salt mixture having lithium trifluoromethanesulfonate and lithium trifluoromethanesulfonimide. The electrolyte can be used in a cell, e.g., one that contains less than 1500 ppm, e.g., less than 1000 ppm, or less than 500 ppm by weight of sodium.

The electrolyte may include a mixture of solvents including less than 30%, e.g., 10-20%, by weight of ethylene carbonate, and 40-85%, e.g., 50-70%, by weight of dimethoxyethane; and the salt mixture may have a concentration between 0.4 M and 1.2 M in the mixture of solvents.

The electrolyte may include a mixture of solvents including 5-15% by weight of ethylene carbonate, 70-80% by weight of dimethoxyethane, and 10-20% by weight of propylene carbonate.

Embodiments may have one or more of the following advantages. The cells can have good capacity, after production and/or after storage for extended periods of time.

Other features and advantages of the invention will be apparent from the description of the preferred embodiments thereof and from the claims.

DETAILED DESCRIPTION

Figure 1:
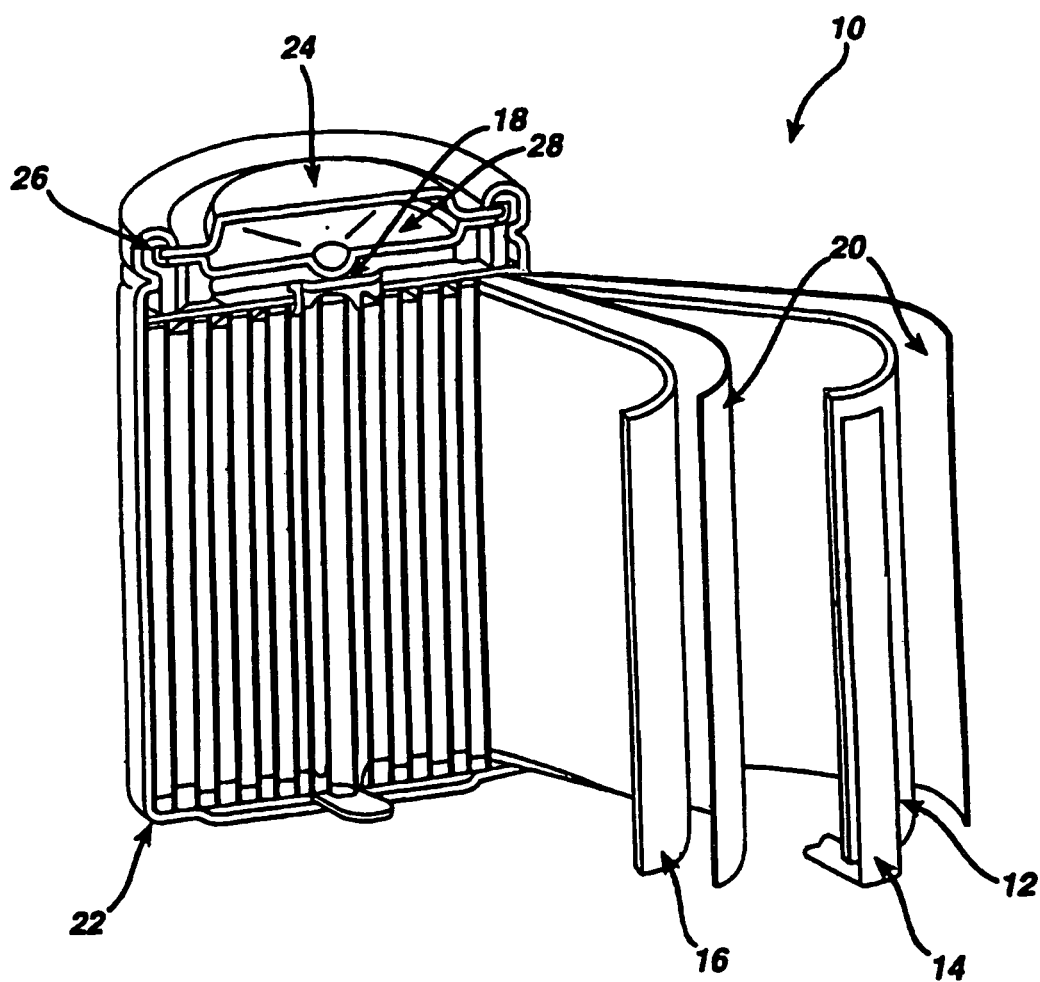
FIG. 1 is a sectional view of a nonaqueous electrochemical cell.

Referring to FIG. 1, an electrochemical cell 10 includes an anode 12 in electrical contact with a negative current collector 14, a cathode 16 in electrical contact with a positive current collector 18, a separator 20, and an electrolyte. Anode 12, cathode 16, separator 20, and the electrolyte are contained within a case 22. The electrolytic solution includes a mixture of solvents and a salt that is at least partially dissolved in the mixture of solvents.

The electrolyte can be in liquid, solid or gel (polymer) form. The electrolyte can contain an organic solvent such as propylene carbonate (PC), ethylene carbonate (EC), dimethoxyethane (DME), dioxolane (DO), tetrahydrofuran (THF), acetonitrile ($CH_3CN$), gamma-butyrolactone, diethyl carbonate (DEC), dimethyl carbonate (DMC), ethyl methyl carbonate (EMC) dimethylsulfoxide (DMSO), methyl acetate (MA), methyl formiate (MF), sulfolane or combinations thereof. The electrolyte can alternatively contain an inorganic solvent such as $SO_2$ or $SOCl_2$. The solvents can be selected to provide a mixture having a combination of physical and chemical properties. For example, the electrolyte can include a first solvent, such as PC or EC, that is polar, sluggishly reactive, and/or high boiling; and a second solvent, such as DME, THF, or DMC, that is relatively less polar, volatile, relatively non-viscous, and/or unreactive.

The electrolyte can also contain a lithium salt such as lithium trifluoromethanesulfonate (LiTFS) or lithium trifluoromethanesulfonimide (LiTFSI), or a combination thereof. Additional lithium salts that can be included are listed in U.S. Pat. No. 5,595,841, which is hereby incorporated by reference in its entirety.

In some embodiments, cell 10 includes an electrolyte formed of a mixture of solvents having DME and PC, and a salt mixture of LiTFS and LiTFSI. Cell 10 can further have a low sodium concentration. The concentration of DME in the mixture of solvents can range from about 30% to about 85%. The concentration of DME in the mixture of solvents can be equal to or greater than 30%, 35%, 40%, 45%, 50%, 55%, 60%, 65%, 70%, 75%, or 80%; and/or equal to or less than 85%, 80%, 75%, 70%, 65%, 60%, 55%, 50%, 45%, 40%, or 35%. The concentration of PC in the mixture of solvents can be equal to 100% minus the concentration of DME. For example, if the concentration of DME in the mixture of solvents is 75%, then the concentration of PC in the mixture of solvents is 25%. If the concentration of DME in the mixture of solvents is 50%-75%, then the concentration of PC in the mixture of solvents is 25%-50%.

For the LiTFS and LiTFSI salt mixture, the total concentration of salt in the mixture of solvents can range from about 0.4 M to about 1.2 M. The total concentration of LiTFS and LiTFSI in the mixture of solvents can be equal to or greater than 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or less than 1.2 M, 1.15 M, 1.10 M, 1.05 M, 1.00 M, 0.95 M, 0.90 M, 0.85 M, 0.80 M, 0.75 M, 0.70 M, 0.65 M, 0.60 M, 0.55 M, 0.50 M, or 0.45 M. Of the total concentration of salt, the concentration of LiTFS in the mixture of solvents can be equal to or greater than 5%, 10%, 15%, 20%, 25%, 30%, 35%, 40%, 45%, 50%, 55%, 60%, 65%, 70%, 75%, 80%, 85%, 90%, or 95%; and/or equal to or less than 95%, 90%, 85%, 80%, 75%, 70%, 65%, 60%, 55%, 50%, 45%, 40%, 35%, 30%, 25%, 20%, 15%, 10%, or 5%. The concentration of LiTFSI in the mixture of solvents can be equal to 100% minus the concentration of LiTFS in the mixture of solvents. For example, if the total concentration of salt in the mixture of solvents is 0.5 M, and the LiTFS concentration in the mixture of solvents is 90% (i.e., 0.45 M), then the LiTFSI concentration in the electrolyte mixture is 10% (i.e., 0.05 M). In embodiments, other types of salts can be added to the electrolyte.

The sodium concentration described herein applies to contents inside cell 10 plus any sodium on the inner side of case 20 and/or cap 24. For example, the sodium content may apply to the electrolyte and a "jelly roll" inside cell 10. The jelly roll is formed of anode 12, cathode 16, current collectors 14 and 18, separator 20, and any protective tapes used in cell 10.

The sodium concentration in cell 10 can be between about 100 ppm to 1500 ppm by weight. The sodium concentration can be equal to or greater than 100, 200, 300, 400, 500, 600, 700, 800, 900, 1000, 1100, 1200, 1300, or 1400 ppm by weight; and/or equal to or less than 1500, 1400, 1300, 1200, 1100, 1000, 900, 800, 700, 600, 500, 400, 300, 200, or 100 ppm by weight. Generally, the concentration of sodium in cell 10 can be controlled, e.g., minimized or reduced, by controlling the manufacturing of the cell. For example, in embodiments in which electrolytic manganese dioxide (EMD) is used in cathode 16, the EMD can be washed and/or neutralized after electrodeposition with an agent that does not contain sodium or have reduced amounts of sodium, such as LiOH. Case 20 can be cleaned with a solution that does not contain sodium or carefully washed. Generally, other components of cell 10, such as anode 12 and separator 20, can be similarly specified not to contain sodium or to contain reduced amounts of sodium.

Other materials can be added to the electrolyte mixture. For example, in certain embodiments, cell 10 includes an electrolyte formed of a mixture of solvents including EC, DME and PC, and a salt mixture of LiTFS and LiTFSI. The concentration of EC in the mixture of solvents can be between about 5% and 30%. The concentration of EC in the mixture of solvents can be equal to or greater than 5%, 10%, 15%, 20%, or 25%; and/or equal to or less than 30%, 25%, 20%, 15%, or 10%. The concentration of DME in the mixture of solvents can range from about 30% to about 85%. The concentration of DME in the mixture of solvents can be equal to or greater than 30%, 35%, 40%, 45%, 50%, 55%, 60%, 65%, 70%, 75%, or 80%; and/or equal to or less than 85%, 80%, 75%, 70%, 65%, 60%, 55%, 50%, 45%, 40%, or 35%. The concentration of PC in the mixture of solvents can be equal to 100% minus the concentration of EC and DME. For example, if the concentration of EC in the mixture of solvents is 15%, and the concentration of DME in the mixture of solvents is 60%, then the concentration of PC in the mixture of solvents is 25%. Examples of an EC:DME:PC solvent mixture are 14:62:24 and 10:75:15 by weight.

The LiTFS and LiTFSI concentrations in the electrolyte, e.g., 0.4-1.2 M, can be generally similar to those described herein. In embodiments, other types of salts can be added to the electrolyte.

The sodium concentration in cell 10, e.g., 100-1500 ppm by weight, can be generally similar to those described herein. Without wishing to be bound by theory, it is believed that as the concentration of EC increases, the concentration of sodium can be increased without substantially affecting cell 10 adversely. Accordingly, in embodiments, the sodium concentration in cell 10 having EC can be between about 100 ppm to 3,000 ppm by weight. The sodium concentration can be equal to or greater than 100, 200, 300, 400, 500, 600, 700, 800, 900, 1000, 1100, 1200, 1300, 1400, 1600, 1800, 1900, 2100, 2300, 2500, 2700, or 2900 ppm by weight; and/or equal to or less than 2900, 2700, 2500, 2300, 2100, 1900, 1800, 1600, 1500, 1400, 1300, 1200, 1100, 1000, 900, 800, 700, 600, 500, 400, 300, 200, or 100 ppm by weight.

Cathode 16 includes an active cathode material, which is generally coated on the cathode current collector. The current collector is generally titanium, stainless steel, nickel, aluminum, or an aluminum alloy, e.g., aluminum foil. The active material can be, e.g., a metal oxide, halide, or chalcogenide; alternatively, the active material can be sulfur, an organosulfur polymer, or a conducting polymer. Specific examples include $MnO_2$, $V_2O_5$, $CoF_3$, $MoS_2$, $FeS_2$, $SOCl_2$, $MoO_3$, S, $(C_6H_5N)_n$, $(S_3N_2)_n$, where n is at least 2. The active material can also be a carbon monofluoride. An example is a compound having the formula $CF_x$, where x is 0.5 to 1.0. The active material can be mixed with a conductive material such as carbon and a binder such as polytetrafluoroethylene (PTFE). An example of a cathode is one that includes aluminum foil coated with $MnO_2$. The cathode can be prepared as described in U.S. Pat. No. 4,279,972.

Anode 12 can consist of an active anode material, usually in the form of an alkali metal, e.g., Li, K, or an alkaline earth metal, e.g., Ca, Mg. The anode can also consist of alloys of alkali metals and alkaline earth metals or alloys of alkali metals and Al. The anode can be used with or without a substrate. The anode also can consist of an active anode material and a binder. In this case an active anode material can include carbon, graphite, an acetylenic mesophase carbon, coke, a metal oxide and/or a lithiated metal oxide. The binder can be, for example, PTFE. The active anode material and binder can be mixed to form a paste that can be applied to the substrate of anode 12.

In some embodiments, sodium content in a lithium anode is less than about 500 ppm by weight, e.g., less than 400 ppm, less than 300 ppm, less than 200, or less than 100 ppm. The sodium content can be controlled by carefully controlling anode processing (e.g., lithium extrusion), cell processing, cell aging, cell predischarge, cell storage, and/or cell discharge.

Separator 20 can be formed of any of the standard separator materials used in nonaqueous electrochemical cells. For example, separator 20 can be formed of polypropylene (e.g., nonwoven polypropylene or microporous polypropylene), polyethylene, layers of polypropylene and polyethylene, and/or a polysulfone.

To assemble the cell, separator 20 can be cut into pieces of a similar size as anode 12 and cathode 16 and placed therebetween as shown in FIG. 1. Anode 12, cathode 16, and separator 20 are then placed within case 22, which can be made of a metal such as nickel, nickel plated steel, stainless steel, or aluminum, or a plastic such as polyvinyl chloride, polypropylene, polysulfone, ABS or a polyamide. Case 22 is then filled with the electrolytic solution and sealed. One end of case 22 is closed with a cap 24 and an annular insulating gasket 26 that can provide a gas-tight and fluid-tight seal. Positive current collector 18, which can be made of aluminum, connects cathode 16 to cap 24. Cap 24 may also be made of aluminum. A safety valve 28 is disposed in the inner side of cap 24 and is configured to decrease the pressure within battery 10 when the pressure exceeds some predetermined value. Additional methods for assembling the cell are described in U.S. Pat. Nos. 4,279,972; 4,401,735; and 4,526,846.

Other configurations of battery 10 can also be used, including, e.g., the coin cell configuration. The batteries can be of different voltages, e.g., 1.5V, 3.0V, or 4.0V.

Other embodiments are within the claims.

What is claimed is:

1. A method of manufacturing a lithium electrochemical cell containing less than 1500 ppm by weight of sodium, the method comprising
   (a) cleaning a case with a solution that does not contain sodium,
   (b) providing a cathode, an anode, a separator, and an electrolyte comprising propylene carbonate, dimethoxyethane, lithium trifluoromethanesulfonate, and lithium trifluoromethanesulfonimide, these components having sufficiently low quantities of sodium that, when combined with the case, can provide a lithium electrochemical cell containing less than 1500 ppm by weight of sodium, and
   (c) assembling the cathode, the anode, the separator, and the electrolyte from step (b) into the case from step (a) to provide a lithium electrochemical cell containing less than 1500 ppm by weight of sodium.

2. The method of claim 1, wherein the cathode includes electrolytic manganese dioxide that has been washed or neutralized after deposition with an agent that does not include sodium.

3. The method of claim 1, wherein the cathode includes electrolytic manganese dioxide that has been washed or neutralized after deposition with lithium hydroxide.

4. The method of claim 1, wherein the cell contains less than 1200 ppm by weight of sodium.

5. The method of claim 1, wherein the cell contains less than 1000 ppm by weight of sodium.

6. The method of claim 1, wherein the cell contains less than 800 ppm by weight of sodium.

7. The method of claim 1, wherein the cell contains less than 600 ppm by weight of sodium.

8. The method of claim 1, wherein the electrolyte comprises:
   40-80% by weight of the dimethoxyethane,
   20-60% by weight of the propylene carbonate, and
   between 0.4 M and 1.2 M of the lithium trifluoromethanesulfonate and the lithium trifluoromethanesulfonimide combined.

9. A method of manufacturing a lithium electrochemical cell containing less than 1500 ppm by weight of sodium, the method comprising
   (a) cleaning a case with a solution that does not contain sodium,
   (b) providing a cathode, an anode, a separator, and an electrolyte comprising ethylene carbonate, propylene carbonate, dimethoxyethane, lithium trifluoromethanesulfonate, and lithium trifluoromethanesulfonimide, these components having sufficiently low quantities of sodium that, when combined with the case, can provide a lithium electrochemical cell containing less than 1500 ppm by weight of sodium, and
   (c) assembling the cathode, the anode, the separator, and the electrolyte from step (b) into the case from step (a) to provide a lithium electrochemical cell containing less than 1500 ppm by weight of sodium.

10. The method of claim 9, wherein the cathode includes electrolytic manganese dioxide that has been washed or neutralized after deposition with an agent that does not include sodium.

11. The method of claim 9, wherein the cathode includes electrolytic manganese dioxide that has been washed or neutralized after deposition with lithium hydroxide.

12. The method of claim 9, wherein the cell contains less than 1200 ppm by weight of sodium.

13. The method of claim 9, wherein the cell contains less than 1000 ppm by weight of sodium.

14. The method of claim 9, wherein the cell contains less than 800 ppm by weight of sodium.

15. The cell of claim 9, wherein the cell contains less than 600 ppm by weight of sodium.

16. The method of claim 9, wherein the electrolyte comprises:
   less than 30% by weight of ethylene carbonate,
   40-85% by weight of dimethoxyethane, and
   between 0.4 M and 1.2 M of the lithium trifluoromethanesulfonate and the lithium trifluoromethanesulfonimide combined.

17. The method of claim 16, wherein the electrolyte comprises:
   10-20% by weight of ethylene carbonate;
   50-70% by weight of dimethoxyethane.

18. The method of claim 16, wherein the electrolyte comprises:
   5-15% by weight of ethylene carbonate;
   70-80% by weight of dimethoxyethane; and
   10-20% by weight of propylene carbonate.

* * * * *

UNITED STATES PATENT AND TRADEMARK OFFICE
CERTIFICATE OF CORRECTION

| | | |
|---|---|---|
| PATENT NO. | : 7,566,350 B2 | Page 1 of 1 |
| APPLICATION NO. | : 11/516084 | |
| DATED | : July 28, 2009 | |
| INVENTOR(S) | : William L. Bowden, Nikolai N. Issaev and Michael Pozin | |

It is certified that error appears in the above-identified patent and that said Letters Patent is hereby corrected as shown below:

Column 6, in claim 15, line 43, delete "cell of" and insert --method of--.

Signed and Sealed this

Twenty-ninth Day of September, 2009

David J. Kappos
*Director of the United States Patent and Trademark Office*